(12) United States Patent
Melchiors et al.

(10) Patent No.: US 6,787,627 B2
(45) Date of Patent: Sep. 7, 2004

(54) AQUEOUS COATING COMPOSITIONS BASED ON EPOXYBUTENE POLYETHERS

(75) Inventors: Martin Melchiors, Leichlingen (DE); Jan Weikard, Odenthal-Erberich (DE); Rolf Gertzmann, Leverkusen (DE); Helmut Greiving, Wuppertal (DE); Ulrich Freudenberg, Pulheim (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/368,159

(22) Filed: Feb. 18, 2003

(65) Prior Publication Data

US 2003/0232955 A1 Dec. 18, 2003

(30) Foreign Application Priority Data

Feb. 18, 2002 (DE) .......................... 102 06 565

(51) Int. Cl.⁷ .............................. C08G 18/62
(52) U.S. Cl. ..................... 528/71; 528/75; 524/591; 524/840; 428/423.1
(58) Field of Search ................. 524/591, 840; 528/71, 75; 428/423.1

(56) References Cited

U.S. PATENT DOCUMENTS

| 3,991,036 A | 11/1976 | Nudenberg et al. ..... 260/75 NQ |
| 5,393,865 A | 2/1995 | Ash et al. .................... 528/388 |
| 5,494,977 A | 2/1996 | Harano et al. .............. 525/438 |
| 5,510,428 A | 4/1996 | Harano et al. .............. 525/438 |
| 6,451,926 B1 | 9/2002 | Kuo et al. ................... 525/403 |

FOREIGN PATENT DOCUMENTS

| CA | 2 378 149 | 1/2002 |
| WO | 00/66646 | 11/2000 |

*Primary Examiner*—Rachel Gorr
(74) *Attorney, Agent, or Firm*—Joseph C. Gil; Gary F. Matz

(57) ABSTRACT

The invention relates to water-dilutable polyurethanes containing structural units derived from 3,4-epoxy-1-butene and also to aqueous dispersions comprising these polyurethanes, to a process for preparing them and to use as aqueous oxidatively drying and/or UV-crosslinking coating compositions.

25 Claims, No Drawings

AQUEOUS COATING COMPOSITIONS BASED ON EPOXYBUTENE POLYETHERS

FIELD OF THE INVENTION

The invention relates to water-dilutable polyurethanes containing structural units derived from 3,4-epoxy-1-butene and also to aqueous dispersions comprising these polyurethanes, to a process for preparing them and to use as aqueous oxidatively drying and/or UV-crosslinking coating compositions.

BACKGROUND OF THE INVENTION

Polymeric compounds which may comprise the structural units of 3,4-epoxy-1-butene are known in principle. EP-A 0 217 660, for example, describes the preparation of poly(α-hydroxycarboxylic acid) copolymers using ethylenically unsaturated epoxides.

U.S. Pat. No. 5,393,867 discloses hydroxy-functional polyethers which are obtained by polymerizing 3,4-epoxy-1-butene with palladium catalysts.

EP-A 0 859 021 describes compounds which possess pendant vinyl groups and are prepared by reacting (a) compounds comprising at least one vinyl group and at least one epoxy group, (b) a polybasic compound or its anhydride, and if desired (c) a CH-acidic compound; their epoxidized derivatives are also described.

WO 00/66646 discloses oil-free oxidatively drying polyester resins which are obtained by derivatizing carboxyl-functional polyesters with 3,4-epoxy-1-butene and also discloses the use of these resins in combination with an organic solvent and a drying catalyst in coatings which dry at room temperature.

WO 00/66649, finally, discloses coating compositions based on polyether alcohols which are prepared by ring-opening polymerization of 3,4-epoxybutene with water or alcohols. The polyether alcohols thus prepared can be used as reactive diluents or binders in oxidatively drying coatings and also as a building block for such binders.

Disadvantages of the aqueous one-component coating materials known to date in coatings technology include the fact that, for example, the drying of oxidatively crosslinking waterborne coating materials at room temperature is often slow, even where siccatives are added as drying accelerators, and that only moderate film hardnesses are achieved. UV-curing aqueous one-component coating materials, on the other hand, exhibit insufficient crosslinking in areas which have been irradiated with a relatively low UV dose or not at all (shadow regions). The coating films in these areas have a low-grade level of properties.

It was an object of the present invention, accordingly, to provide aqueous dispersions which are capable of oxidative drying and/or crosslinking with UV light and which can be processed to give one-component coating materials having a high level of properties, especially with respect to film optical properties, hardness, solvent resistance, weather resistance, and rapid drying.

SUMMARY OF THE INVENTION

It has been possible to achieve this object by providing a water-dilutable polymer which contains urethane groups, which contains the structural units of 3,4-epoxy-1-butene, and which can be used as a basis for a one-component aqueous dispersion.

The present invention accordingly provides a water-dilutable polymer containing urethane groups and containing ionic and/or potentially ionic groups, characterized in that the polymer comprises the repeating units (A1) of the formula (I) and/or (A2) of the formula (II)

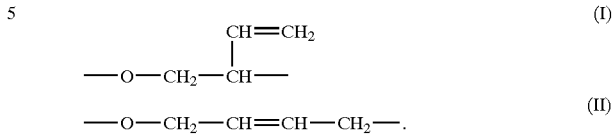

The repeating units A1, A2 or A1/A2 mixtures in the polymer are in blocks

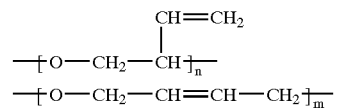

or in blocks which are a mixture of both structural units, with p repeating units, where n, m and p each represent whole numbers from 3 to 100.

It is likewise possible for the A1 or A2 repeating units to be distributed differently in the copolymer.

DETAILED DESCRIPTION OF THE INVENTION

The amount of A1 and/or A2 units in the polymer of the invention is from 2 to 80% by weight, preferably from 5 to 50% by weight, with particular preference from 8 to 35% by weight.

The structural units A1 and/or A2 present in the polymers of the invention can be obtained by opening the epoxide ring of 3,4-epoxy-1-butene. It is possible here to subject 3,4-epoxy-1-butene (singly or multiply) to addition reaction on nucleophilic centres of a polymer or oligomer chain, such as an addition reaction at COOH—, OH— or NH-functional chain ends, for example, via opening of the epoxides ring. An alternative possibility is to use a polyether alcohol oligomer or polymer containing, one or more OH groups, prepared by ring-opening polymerization of 3,4-epoxy-1-butene, in the presence where appropriate of further monomers which can be polymerized under these conditions, such as ethylene oxide, propylene oxide or butylene oxide, for example, as building blocks for constructing the polyurethane chain. The structural units A1 and/or A2 are preferably introduced by incorporating hydroxy-functional polyetherpolyols into the polyurethanes.

Apart from the initiator components incorporated in the chain, the polyetherpolyols may be composed entirely of repeating units A1 and/or A2 (homopolymer) or else may be present in copolymer form, with other monomers which can be polymerized under these conditions, such as with ethylene oxide, propylene oxide or butylene oxide. For preparing polyether alcohols by homopolymerizing 3,4-epoxy-1-butene a macroinitiator comprising repeating units of the aforementioned comonomers can be used. Examples of suitable catalysts for preparing the polyether alcohols are KOH, trifluoromethanesulphonic acid or its salts with yttrium or with other lanthanide metals, palladium(0) compounds in accordance with U.S. Pat. No. 5,393,867 such as tetrakistrisphenylphosphinepalladium(0)

A preferred embodiment for the ring-opening polymerization of 3-4, epoxybutene includes the use of a double metal cyanide catalyst (DMC) and an alcohol molecule as a starter. DMC-catalysts and the polymerization of epoxides with these catalysts are described in EP-A 0 700 949 (U.S. Pat. No. 5,482,908, hereby incorporated by reference). Particular suitable polymers and copolymers can also be prepared according to copending application with the internal number MD-00-137.

The polymer of the invention comprises from 1 to 40% by weight of urethane groups [NHCOO], preferably from 2 to 30% by weight of urethane groups, with particular preference from 5 to 25% by weight and with very particular preference from 15 to 25% by weight of urethane groups.

Furthermore, the polymers of the invention comprise in total from 9 to 100 meq/100 g of ionic and/or potentially ionic groups, in order to bring about dispersibility or solubility in an aqueous medium. The amount of the ionic and/or potentially ionic groups is preferably in total from 20 to 60 meq/100 g, with particular preference in total from 25 to 50 meq/100 g.

The water-dilutable polymer of the invention is preferably a reaction product A) comprising the following components:
(a1) from 5 to 80% by weight, preferably from 10 to 60% by weight, of polyisocyanates,
(a2) from 10 to 80% by weight, preferably from 40 to 70% by weight, of polyols and/or polyamines with an average molar weight $M_n$ of at least 400,
(a3) from 2 to 15% by weight, preferably from 3 to 10% by weight, of compounds containing at least one group which is reactive towards isocyanate groups and at least one ionic and/or potentially ionic group,
(a4) from 0 to 20% by weight, preferably from 1 to 10% by weight, of low molecular mass polyols and/or secondary polyamines,
(a5) from 0 to 20% by weight of chain terminators,
(a6) from 0 to 20% by weight of chain extenders, which contain at least two groups which are reactive toward isocyanate groups, and are different from (a2), (a3) and (a4).

The water-dilutable polymers of the invention possess an average molecular weight $M_n$, of from 1000 to 50 000, preferably from 1600 to 10 000.

The polyisocyanates, preferably diisocyanates (a1) are the compounds which are known in the field of polyurethanes and coatings, such as aliphatic, cycloaliphatic or aromatic isocyanates.

Suitable compounds include those of the general formula $Q(NCO)_2$, where Q stands for a hydrocarbon radical having from 4 to 40 carbon atoms, preferably from 4 to 20 carbon atoms. Q is preferably an aliphatic $C_4$–$C_{12}$ radical, a cycloaliphatic $C_6$–$C_{15}$ radical, an aromatic $C_6$–$C_{15}$ radical or an araliphatic $C_7$–$C_{15}$ radical.

Particularly preferred diisocyanates are, for example, tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate), 4,4'-diisocyanatodicyclohexylmethane, 4,4'-diisocyanatodicyclohexyl-2,2-propane, 1,4-diisocyanatobenzene, 2,4- or 2,6-diisocyanatotoluene or mixtures of these isomers, 4-4'- or 2,4'-diisocyanatodiphenylmethane, 4,4'-diisocyanatodiphenyl-2,2-propane, p-xylylene diisocyanate and α,α,α',α'-tetramethyl-m- or p-xylylene diisocyanate, and also mixtures of these compounds.

In addition to these simple polyisocyanates, suitable polyisocyanates also include those which contain heteroatoms in the radical linking the isocyanate groups and/or which possess a functionality of greater than or equal to 2 NCO groups per molecule. Examples thereof are polyisocyanates which contain carbodiimide groups, allophanate groups, isocyanurate groups, urethane groups, acylated urea groups, iminooxadiazinedione groups, uretdione groups or biuret groups, and also 4-isocyanatomethyl-1,8-octane diisocyanate (nonane triisocyanate).

For further suitable polyisocyanates, refer for example to DE-A 29 28 552, pp. 14–16. Likewise suitable are mixtures of these compounds.

Component (a2) preferably possesses an average molecular weight $M_n$, of from 400 to 5000, with particular preference from 800 to 2000. The hydroxyl number or amine number is generally from 22 to 400, preferably from 50 to 200 and with particular preference from 80 to 160 mg/KOH/g.

Suitable polyols (a2) are the compounds known from polyurethane chemistry, such as polyetherpolyols, polyesterpolyols, polycarbonatepolyols, polyesteramidepolyols, polyamidepolyols, epoxy resin polyols and reaction products thereof with $CO_2$, polyacrylatepolyols and similar compounds, for example. Polyols of this kind, which can also be used in a mixture, are described, for example, in DE-A 20 20 905, DE-A 23 14 513 and DE-A 31 24 784 and also in EP-A 0 120 466.

Instead of OH groups, the compounds of component (a2) may also comprise primary or secondary amino groups (in part or entirely) as NCO-reactive groups.

Likewise suitable as component (a2) are aspartic esters of the abovementioned molar weight, such as are set out, for example, in EP-A 0 403 921, pp. 4–5. Secondary amines of this kind can also be used as a mixture with the polyols.

Preferred polyols are the polyetherpolyols and polyesterpolyols, particular preference attaching to those which contain only terminal OH groups and possess a functionality of less than or equal to 3, preferably from 2.8 to 2.

Preferred polyesterpolyols are the known polycondensates of di- and also, where appropriate, poly(tri,tetra)ols and mono-, di- and, where appropriate, poly(tri,tetra)carboxylic acids or hydroxycarboxylic acids or of lactones. Instead of the free carboxylic acids it is also possible to use the corresponding polycarboxylic anhydrides or corresponding polycarboxylic esters of lower alcohols for preparing the polyesters. Examples of suitable diols are ethylene glycol, butylene glycol, diethylene glycol, triethylene glycol, polyalkylene glycols such as polyethylene glycol, and also propanediol, butane-1,4-diol, hexane-1,6-diol, neopentyl glycol or neopentyl glycol hydroxypivalate. Hexane-1,6-diol, neopentyl glycol or neopentyl glycol hydroxypivalate are preferred compounds. As polyols which may be used as well where appropriate, mention may be made here, for example, of trimethylolpropane, glycerol, erythritol, pentaerythritol, trimethylolbenzene or tris-hydroxyethyl isocyanurate.

Examples of suitable dicarboxylic and polycarboxylic acids are phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid, trimellitic acid or pyromellitic acid. Anhydrides of these acids can also be used where they exist. For the purposes of the present invention, therefore, the anhydrides are embraced by the expression "acid". It is also possible to use monocarboxylic acids, provided that the average functionality of the polyol is greater than or equal to 2.

Examples of suitable hydroxycarboxylic acids for preparing a polyesterpolyol having terminal hydroxyl are hydroxycaproic acid, hydroxybutyric acid, hydroxydecanoic acid, hydroxystearic acid and the like. Examples of suitable lactones are caprolactone, butyrolactone and the like.

Very particular preference is given to using polyetherpolyols comprising in whole or in part A1 and/or A2 repeating units and also polyoxyethylenepolyols, polyoxypropylenepolyols, polyoxybutylenepolyols or polytetrahydrofurans containing terminal OH groups.

Moreover, the polymers of the invention may comprise polyoxyalkylene ethers which are free from A1 and/or A2 repeating units but which carry per molecule at least one hydroxyl or amino group, such as those preparable, for example, from an alcohol and from polyethylene oxide/polypropylene oxide blocks having a molar weight of from 400 to 4000.

In one preferred embodiment of the present invention (a2) comprises, at least in part, an oligoester or polyester which comprises monounsaturated and/or polyunsaturated fatty acids. Examples of suitable fatty acids are coconut oil fatty acid, soya oil fatty acid, safflower oil fatty acid, castor fatty acid, ricinene acid, groundnut oil fatty acid, tall oil fatty acid or conjuene fatty acid. Examples of suitable further monocarboxylic acids are benzoic acid, tert-butylbenzoic acid, hexahydrobenzoic acid, 2-ethylhexanoic acid, isononanoic acid, decanoic acid or octadecanoic acid. As monocarboxylic acid it is preferred to use soya oil fatty acid or a mixture of 70 to 100% by weight of soya oil fatty acid and 0 to 30% by weight of benzoic acid. Preferably, therefore, in addition to the allylic double bonds present in the structural units A1 and/or A2, the polymer of the invention further comprises C=C double bonds of monounsaturated or polyunsaturated fatty acids.

In another preferred embodiment component (a2) comprises at least in part a polyol which further contains C=C double bonds in acrylic ester and/or methacrylic ester units A3) of the formula (III)

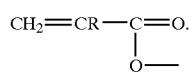
(III)

Preference is given to using hydroxyl-containing polyester acrylates having an OH content of from 30 to 300 mg KOH/g. In preparing the hydroxy-functional polyester acrylates a total of 7 groups of monomer constituents may be employed:

1. (Cyclo)alkanediols, for example dihydric alcohols containing (cyclo)aliphatically attached hydroxyl groups of the molecular weight range from 62 to 286, such as ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, such as diethylene glycol, triethylene glycol, tetraethylene glycol, dipropylene glycol, tripropylene glycol, or the polyethylene, polypropylene or polybutylene glycols, where these have a maximum molecular weight of 2000, preferably of 1000 and with particular preference of 500. Reaction products of the aforementioned diols with ε-caprolactone or other lactones may likewise be employed as diols.
2. Trihydric and higher polyhydric alcohols of the molecular weight range from 92 to 254, such as glycerol, trimethylolpropane, pentaerythritol, dipentaerythritol and sorbitol, for example, or polyethers formed starting from these alcohols, such as the reaction product of 1 mol of trimethylolpropane with 4 mol of ethylene oxide.
3. Monoalcohols such as ethanol, 1- and 2-propanol, 1- and 2-butanol, 1-hexanol, 2-ethylhexanol, cyclohexanol and benzyl alcohol, for example.
4. Dicarboxylic acids of the molecular weight range from 104 to 600 and/or their anhydrides, such as phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecanedioic acid, hydrogenated dimer fatty acids, for example.
5. Carboxylic acids of higher functionality and their anhydrides, such as trimellitic acid and trimellitic anhydride, for example.
6. Monocarboxylic acids, such as benzoic acid, cyclohexanecarboxylic acid, 2-ethylhexanoic acid, caproic acid, caprylic acid, capric acid, lauric acid, natural and synthetic fatty acids, for example.
7. Acrylic acid, methacrylic acid and dimeric acrylic acid.

Particularly preferred hydroxyl-containing polyester acrylates comprise the reaction product of at least one component from group 1 or 2 with at least one component from group 4 or 5 and at least one component from group 7.

It is also possible to incorporate groups with a dispersive effect into the polyester acrylates for use in accordance with the invention, including dispersive groups which are general knowledge from the prior art, such as those described, for example, in Progress in Organic Coatings, 9 (1981), 291–296. Accordingly, it is possible as alcohol component to incorporate, for example, fractions of polyethylene glycols and/or of methoxypolyethylene glycols. Compounds that may be mentioned include, for example, alcohol-started polyethylene glycols, polypropylene glycols, and their block copolymers and the monomethyl ethers of these polyglycols. Preference is given to polyethylene glycol 1500 and/or polyethylene glycol 500 monomethyl ether.

A further possibility is to react some of the (excess) carboxyl groups, especially those of the (meth)acrylic acid, with mono-, di- or polyepoxides. Preferred epoxides are epoxides (glycidyl ethers) of monomeric, oligomeric or polymeric bisphenol A, bisphenol F, hexanediol and/or butanediol. This reaction may be used in particular for the purpose of increasing the OH number of the polyester acrylate, since an OH group is formed in each epoxide-acid reaction.

The preparation of polyester acrylates in the sense of the present invention is described, for example, in DE-A 4 040 290, DE-A 3 316 592 and P.K.T. Oldring (Ed.), Chemistry & Technology of UV & EB Formulations For Coatings, Inks & Paints, Vol. 2, 1991, SITA Technology, London, pp. 123–135.

The acid number of the polyester acrylates is less than or equal to 20 mg KOH/g, preferably less than or equal to 10 mg KOH/g and with particular preference less than or equal to 5 mg KOH/g.

Alternatively, it is also possible to use hydroxyl-containing epoxy acrylates, hydroxyl-containing polyether acrylates or hydroxyl-containing polyurethane acrylates which have OH contents of from 20 to 300 mg KOH/g and are known per se, and also their mixtures with one another and mixtures with hydroxyl-containing unsaturated polyesters and also mixtures with polyester acrylates or mixtures of hydroxyl-containing unsaturated polyesters with polyester acrylates.

In addition to the allylic double bonds present from the structural units in A1 and/or A2, therefore, the polymer of the invention preferably further comprises (meth)acrylic ester double bonds.

Compounds suitable as component (a3) are those containing at least one group which is reactive towards isocyanate groups and at least one ionic and/or potentially ionic group. By potentially ionic groups are meant those groups which are capable of forming an ionic group. Examples of ionic or potentially ionic groups are carboxyl, sulphonic acid, phosphoric acid or phosphonic acid groups and their corresponding anions. Preference is given to carboxyl(ate) and/or sulphon(at)e groups. Suitable components (a3) are described, for example, in U.S. Pat. No. 3,412,054, columns 1 and 2, U.S. Pat. No. 3,640,924, column 3, and DE-A 26 24 442, pages 25 to 26, hereby incorporated by reference.

Likewise suitable are amino-containing compounds (a3), such as $\alpha,\delta$-diaminovaleric acid or 2,4-diaminotoluene-5-sulphonic acid, for example. Mixtures of these compounds (a3) may also be employed.

Particularly preferred compounds (a3) are alcohols which comprise at least one carboxyl group, preferably from 1 to 3 carboxyl groups per molecule. Examples thereof are hydroxypivalic acid, dihydroxycarboxylic acids, such as $\alpha,\alpha$-dialkylol-alkanoic acids, especially $\alpha,\alpha$-dimethylolalkanoic acids, such as 2,2-dimethylolacetic acid, 2,2-dimethylolpropionic acid, 2,2-dimethylolbutyric acid, 2,2-dimethylolpentanoic acid, dihydroxysuccinic acid, and also polyhydroxy acids, such as gluconic acid. Very particular preference is given to 2,2-dimethylolpropionic acid.

The low molecular mass polyols and/or secondary polyamines (a4) used where appropriate for the synthesis of the polymers of the invention generally have the effect of stiffening the polymer chain. They have a molecular weight of from 62 to 400, preferably from 62 to 200, and may comprise aliphatic, alicyclic or aromatic groups.

Suitable components (a4) include low molecular mass polyols having up to about 20 carbon atoms per molecule, such as ethylene glycol, diethylene glycol, 1,2-propanediol, 1,3-propanediol, 1,4-butanediol, 1,3-butylene glycol, cyclohexanediol, 1,4-cyclohexanedimethanol, 1,6-hexanediol, bisphenol A (2,2-bis(4-hydroxy-phenyl) propane), hydrogenated bisphenol A (2,2-bis(4-hydroxycyclohexyl)propane) and aspartic esters, for example, as described in EP-A 0 403 924, and also mixtures thereof. Triols such as trimethylolpropane and/or glycerol may likewise be used as well. Likewise suitable are polyols which comprise a maximum of 5 epoxybutene units (A1/A2) formed starting from water, from short-chain polyols or from polyamines and which have an average molecular weight of less than 400.

The polymer of the invention may where appropriate also comprise building blocks (a5), which in each case are located at the chain ends and terminate those ends, referred to as chain terminators.

Suitable components (a5) derive from monofunctional, NCO-reactive compounds, such as monoamines, preferably mono-secondary amines, or monoalcohols, for example. Examples that may be mentioned here are methylamine, ethylamine, propylamine, butylamine, octylamine, laurylamine, stearylamine, isononyloxypropyl-amine, dimethylamine, diethylamine, dipropylamine, dibutylamine, N-methylaminopropylamine, diethyl(methyl) aminopropylamine, morpholine, piperidine or their substituted derivatives, amide-amines formed from diprimary amines and monocarboxylic acids, monoketimines of diprimary amines, primary/tertiary amines, such as N,N-dimethylaminopropylamine.

Likewise suitable components (a5) are mono-hydroxyfunctional esters of acrylic and/or methacrylic acid, known as (meth)acrylates. Examples of such compounds are the mono(meth)acrylates of dihydric alcohols, such as ethanediol, the isomeric propanediols and butanediols, for example, or (meth)acrylates of polyhydric alcohols such as trimethylolpropane, glycerol and pentaerythritol, for example, which contain on average one free hydroxy group.

Preferred compounds (a5) are those comprising active hydrogen with different reactivity towards NCO groups. These are, for example, compounds which contain secondary amino groups in addition to a primary amino group or contain COOH groups in addition to an OH group or contain OH groups in addition to an amino group (primary or secondary), the latter cases being preferred. Examples thereof are primary/secondary amines, such as 3-amino-1-methylaminopropane, 3-amino-1-ethylaminopropane, 3-amino-1-cyclohexylaminopropane, 3-amino-1-methylaminobutane, monohydroxycarboxylic acids, such as hydroxyacetic acid, lactic acid or malic acid, and also alkanolamines such as N-aminoethylethanolamine, ethanolamine, 3-aminopropanol, neopentanolamine and, with particular preference, diethanolamine. Likewise suitable as aspartic esters based on the said amino alcohols, such as are mentioned in EP-A 0 743 333.

Where appropriate, the polymer of the invention may further comprise building blocks (a6) which derive from what are known as chain extenders. Suitable such compounds are the compounds known for this purpose which are reactive with NCO groups, are preferably difunctional, are not identical with (a2), (a3), (a4) and (a5), and mostly have average molecular weights of less than 400. Examples that may be mentioned here are water, hydrazine, adipic dihydrazide, poly(di)amines, such as ethylenediamine, diethylenetriamine, dimethylethylenediamine, diaminopropane, hexamethylenediamine, isophronediamine, 4,4'-diaminodicyclohexylmethane, where these may also carry substituents, such as OH groups, and also mixtures of the said components. Polyamines of this kind are disclosed, for example, in DE-A 36 44 371.

The preparation of the polymers of the invention is described in the prior art, for example in EP-A 0 355 682, EP-A 0 427 028 or DE-A 39 01 190.

The preparation may take place, for example, by first preparing an isocyanate-functional prepolymer and in a second reaction step, by reaction with compounds (a5) and/or (a6), obtaining an OH-functional and/or NH-functional compound, as disclosed in EP-A 0 355 682, for example. Alternatively, the preparation may take place by formation of the OH-containing polyurethane resin directly through reaction of the components (a1) to (a6), as described in EP-A 0 427 028, for example.

The polymer A) of the invention is preferably prepared by first using components (a1, polyisocyanates), (a2, polyols) and, where appropriate, component (a4, low molecular mass polyols) and also components (a3) to prepare a polyurethane prepolymer which comprises on average per molecule at least 1.7, preferably from 2 to 2.5, free isocyanate groups and then in whole or in part reacting this prepolymer with components (a5) and/or (a6) in a non-aqueous system.

In the process of the invention, the polyisocyanate is used in an excess over the polyols (a2) to (a4) so as to result in a product containing free isocyanate groups. These isocyanate groups are terminal and/or pendant, preferably terminal. The amount of polyisocyanates is appropriately sufficient for the equivalents ratio of isocyanate groups to the total number of OH groups in the polyols (a2) to (a4) to be from 1.05 to 2.0, preferably from 1.1 to 1.6.

The preparation of the prepolymer is normally conducted at temperatures from 40° to 140° C., depending on the reactivity of the isocyanate used. In order to accelerate the urethanization reaction it is possible to use suitable catalysts, such as those known to the person skilled in the art for the purpose of accelerating the NCO—OH reaction. Examples are tertiary amines such as triethylamine, for example, organotin compounds such as dibutyltin oxide, dibutyltin dilaurate or tin bis(2-ethylhexanoate), for example, or other organometallic compounds.

The urethanization reaction is preferably conducted in the presence of solvents which are inert towards isocyanates. Solvents particularly suitable for this purpose are those which are compatible with water, such as ethers, ketones and esters and also N-methylpyrrolidone, for example. The amount of this solvent appropriately does not exceed 25% by weight and is preferably situated within the range from 5 to 15% by weight, based in each case on the sum of polyurethane resin and solvent. The polyisocyanate can be added rapidly to the solution of the other components.

The prepolymer or its solution is then reacted with the compound according to (a5) and/or (a6), the temperature appropriately lying within the range from 0° to 90° C., preferably from 20° to 60° C., until the NCO content in the prepolymer has dropped virtually to zero. For this purpose the compound (a5) is used in a substoichiometric amount or in a slight excess, the amounts generally being from 40 to 110% by weight, preferably from 60 to 105% by weight, of the required stoichiometric amount. If relatively unreactive diisocyanates are used to prepare the prepolymer, this reaction may take place simultaneously with the neutralization and also in water. Some of the (non-neutralized) COOH groups, preferably from 5 to 30% by weight, may be reacted where appropriate with difunctional compounds that are reactive with COOH groups, such as diepoxides.

Alternatively, some or all (based on the isocyanate content) of the prepolymer may be reacted with (a5) prior to dispersion, before the remaining isocyanate groups, following dispersion, are reacted in whole or in part with component (a6). In this case the carboxyl groups may be neutralized either before the dispersing step, by adding the neutralizing agent to the prepolymer, or else during dispersing, by adding the neutralization amine to the dispersing water.

The preparation of the polymer A) of the invention may also take place by reacting components (a1) to (a6) in direct reaction to give an OH-functional resin. The reaction conditions in this case correspond to the conditions described for the preparation of the NCO-containing prepolymer. A process of this kind is described, for example, in EP-A 0 427 028.

A further possibility for preparing the polyurethane polymer of the invention is to react resins which contain COOH and/or $SO_3H$ groups and which additionally comprise one or more isocyanate-reactive groups, by way of di-/or polyisocyanates, with polyether alcohols which comprise at least fractions of repeating units A1 and/or A2. Resins suitable for this purpose are, for example, vinyl polymers, polyesters, epoxides or hybrid resins (e.g. acrylate-grafted polyesters or polyurethanes), such as are known from the prior art.

For neutralizing the resultant product containing COOH and/or $SO_3H$ groups, particular suitability is possessed by tertiary amines, for example trialkylamines having from 1 to 12, preferably from 1 to 6, carbon atoms in each alkyl radical. Examples are trimethylamine, triethylamine, methyldiethylamine, tripropylamine and diisopropylethylamine. The alkyl radicals may also, for example, carry hydroxyl groups, as in the case of the dialkylmonoalkanolamines, alkyldialkanolamines and trialkanolamines, such as dimethylethanolamine, for example, which is used preferably as neutralizing agent. As neutralizing agent it is also possible where appropriate to use inorganic bases, such as ammonia or sodium hydroxide or potassium hydroxide. The neutralizing agent is generally used in a molar ratio to the acid groups of the prepolymer of from 0.3:1 to 1.3:1, preferably from 0.5:1 to 1:1.

The COOH or $SO_3H$ groups may be neutralized before, during or following the urethanization reaction. The neutralizing step is generally conducted at between room temperature and 100° C., preferably from 40 to 80° C. It may be carried out arbitrarily, for example by adding the aqueous neutralizing agent to the polyurethane resin or vice versa. However, it is also possible first to add the neutralizing agent to the polyurethane resin and only then to add the water. In this way, generally, solids contents of from 20 to 70% by weight, preferably from 30 to 50% by weight, are obtained.

The present invention also provides aqueous dispersions comprising (A) from 20 to 70% by weight, preferably from 25 to 50% by weight, of at least one water-dilutable polymer of the invention containing urethane groups, (B) from 0 to 20% by weight, preferably 0–10% by weight, of organic cosolvents and (C) from 10 to 70% by weight, preferably from 30 to 60% by weight, of water.

It is also possible to use a mixture of two or more polymers (A) of the invention.

Suitable organic cosolvents (B) are the customary paint solvents known per se, such as ethyl acetate, butyl acetate, ethylene glycol monomethyl or monoethyl ether acetate, 1-methoxypropyl 2-acetate, 3-methoxy-n-butyl acetate, acetone, 2-butanone, 4-methyl-2-pentanone, cyclohexanone, toluene, xylene, chlorobenzene, white spirit, mixtures comprising in particular aromatics with relatively high degrees of substitution, such as are in commerce, for example, under the designations solvent naphtha, Solvesso® (Exxon Mobil Chem. Comp., Houston), Cypar® (Shell Chemicals, UK), Cyclo Sol® (Shell Chem.), Tolu Sol® (Shell Chem.), Shellsol® (Shell Chem.), carbonic esters, such as dimethyl carbonate, diethyl carbonate, 1,2-ethylene carbonate and 1,2-propylene carbonate, lactones, such as β-propiolactone, γ-butyrolactone, ε-caprolactone and ε-methylcaprolactone, but also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

The organic cosolvents (B) may be added to the water-dilutable polymer of the invention which contains urethane groups or to its dispersion subsequently or during preparation. Normally at least some of the organic solvents are added during the preparation or dispersing of the polymer of the invention. For the preparation of low-cosolvent or cosolvent-free dispersions it is also possible to use auxiliary solvents during the preparation process, which are in turn removed in a subsequent step.

In their application as coating compositions, the dispersions comprising the water-dilutable polymers of the invention containing urethane groups are used either alone or in combination with other aqueous binders. Such aqueous binders may be composed, for example, of polyester, polyacrylate, polyepoxide or polyurethane polymers. Also possible is combination with radiation-curable binders, such as those described in EP-A-0 753 531, for example. The dispersions comprising the polymers of the invention may be used as they are or in combination with the auxiliaries and additives known from coatings technology, such as pigments, fillers, for example, and also coatings auxiliaries, examples being antisettling agents, defoamers and/or wetting agents, levelling agents, reactive diluents, plasticizers, catalysts, auxiliary solvents or thickeners, for the purpose of producing coatings.

Likewise provided by the present invention are coating compositions comprising the water-dilutable polymers of the invention containing urethane groups.

The dispersions comprising the polymers of the invention are used as binders for producing coatings. Such coatings may be applied to any desired substrates, examples being wood, metal, plastic, paper, leather, textiles, felt, glass or mineral substrates.

Preference is given to producing oxidatively drying aqueous coatings, characterized in that the coating composition comprises as binder the water-dilutable polymers (A) of the invention containing urethane groups.

For the purpose of accelerating oxidative crosslinking it is possible to add siccatives.

An advantageous feature of the dispersions which comprise the polymers (A) of the invention is that quick-drying coatings can be produced without adding siccatives.

Likewise preferred is the production of UV-curing coatings, characterized in that the coating composition comprises as binder the water-dilutable polymers (A) of the invention containing urethane groups and also one or more photoinitiators.

The UV-curing coatings thus produced are distinguished from the UV-curing coating materials of the prior art by particularly good shadow curing. Particularly when shaped structures are being coated, in contrast to flat structures, a problem which frequently occurs is that UV-curing coatings are soft, tacky and/or unstable in areas subjected only to a low dose, if any, of UV light. In this case, a post-cure by way of a second mechanism, not dependent on the UV light, is advantageous.

Examples of suitable photoinitiators are aromatic ketone compounds such as benzophenones, alkylbenzophenones, 4,4'-bis(dimethylamino)benzophenone (Michler's ketone), anthrone and halogenated benzophenones. Likewise suitable are acylphosphine oxides, such as 2,4,6-trimethylbenzoyldiphenylphosphine oxide, for example, phenylglyoxylic esters, anthraquinone and its derivatives, benzil ketals and hydroxyalkylphenones. Mixtures of these compounds can also be used.

The coating compositions comprising the polymers (A) of the invention can be applied in known ways, for example by spreading, flow coating, knife coating, squirting, spraying, spin coating, rolling or dipping. The coating film can be dried at room temperature or elevated temperature, or else by baking at up to 200° C. Drying preferably takes place at room temperature or only slightly above. Where UV-curing components are present in the dispersions of the invention, the drying process may further include an irradiation with UV light.

During the drying of the coatings, first water and any further solvent are preferably removed from the coating by known methods, and this is then followed by the irradiation with UV light and finally by the oxidative drying.

The present invention also provides substrates coated with coating compositions comprising the water-dilutable polymers (A) of the invention containing urethane groups.

EXAMPLES

All percentages are by weight.

Example 1 (Inventive)

A 15 l reaction vessel with stirrer, heating means and water separator with cooling means is charged with 1022 g of isophthalic acid, 6900 g of soya oil fatty acid, 1278 g of benzoic acid, 3353 g of pentaerythritol and 911 g of phthalic anhydride and this initial charge is heated to 140° C. under nitrogen in one hour. In a further 8 hours it is heated to 220° C. and is condensed at this temperature until an acid number of less than 3 has been reached. The polyester resin thus obtained has a viscosity (determined as the efflux time of a 75% strength solution of the polyester in xylene in the DIN 4 cup at 23° C.) of 105 seconds and an OH number of 175 mg KOH/g.

A 4 l reaction vessel with cooling, heating and stirring means is charged with 607 g of the above-described polyester and this initial charge is heated to 80° C. together with 58 g of dimethylolpropionic acid, 150 g of a linear polyetherdiol having an OH number of 75 mg KOH/g and a number-average molecular weight of 1500 and prepared by ring-opening polymerization of 3,4-epoxy-1-butene with 3,4-dihydroxy-1-butene as starter, 75 g of N-methylpyrrolidone, 75 g of dipropylene glycol dimethyl ether and 22 g of triethylamine and this mixture is homogenized for 30 minutes. Then 185 g of 1-isocyanato-3,3,5-trimethyl-5-isocyanatomethylcyclohexane (IPDI) are added with vigorous stirring and the mixture is heated (utilizing the exothermic nature of the reaction) to 100° C. and held at this temperature until NCO groups can no longer be detected.

The linear polyetherdiol was prepared by adding a solution of 37 g (0.42 mol) 3,4-dihydroxy-1-butene, 600 g 3,4-epoxy-1-butene and 1ml of trimethylorthobenzoate via a syringe pump to 50 mg of a catalyst according to example 3 of U.S. Pat. No. 5,482,908 in 5 ml toluene at 120° C. The rate of addition was such that the reaction temperature did not exceed 155° C. The reaction temperature then stayed at 150° C. until all 3,4 epoxy-1-butene had been consumed. A slightly yellow low viscosity material was obtained.

Number-average molecular weight (GPC) Mn=2074 g/mol.

Polydispersity Mw/Mn=1.15

The product is subsequently dispersed at 95° C. with 1000 g of distilled water and the dispersion is adjusted with water and triethylamine to a viscosity of 930 mPas (D=40 $s^{-1}$, 23° C.).

The aqueous, urethane-modified polyester resin thus obtained has an acid number of 26 mg KOH/g, an average particle size of 150 nm and a solids content of 45.6%.

Example 2 (Inventive)

A 4 l reaction vessel with cooling, heating and stirring means is charged with 607 g of the polyester from Ex. 1 and this initial charge is heated to 80° C. together with 58 g of dimethylolpropionic acid, 150 g of a linear polyetherdiol having an OH number of 73 mg KOH/g and a number-average molecular weight of 1300 and prepared by ring-opening polymerization of a mixture of 3,4-epoxy-1-butene and propylene oxide (molar ratio 50:50) with tripropylene glycol as starter, 150 g of N-methylpyrrolidone and 22 g of triethylamine and this mixture is homogenized for 30 minutes. Then 185 g of 1-isocyanato-3,3,5-trimethyl-5-isocyanatomethylcyclohexane (IPDI) are added with vigorous stirring and the mixture is heated (utilizing the exothermic nature of the reaction) to 100° C. and held at this temperature until NCO groups can no longer be detected.

The product is subsequently dispersed at 95° C. with 1000 g of distilled water and the dispersion is adjusted with water and triethylamine to a viscosity of 640 mPas (D=40 s$^{-1}$, 23° C.).

The aqueous, urethane-modified polyester resin thus obtained has an acid number of 26 mg KOH/g, an average particle size of 170 nm and a solids content of 45.8%.

Example 3 (Inventive)

A 4 l reaction vessel with cooling, heating and stirring means is charged with 612 g of the polyester from Ex. 1 and this initial charge is heated to 80° C. together with 58 g of dimethylolpropionic acid, 150 g of a polyethertriol having an OH number of 56 mg KOH/g and a number-average molecular weight of 4200 and prepared by ring-opening polymerization of a mixture of 3,4-epoxy-1-butene and propylene oxide (molar ratio 50:50) with as starter a propylene oxide polyether, prepared starting from glycerol and having an OH number of 238, 150 g of N-methylpyrrolidone and 22 g of triethylamine and this mixture is homogenized for 30 minutes. Then 180 g of 1-isocyanato-3,3,5-trimethyl-5-isocyanatomethylcyclohexane (IPDI) are added with vigorous stirring and the mixture is heated (utilizing the exothermic nature of the reaction) to 100° C. and held at this temperature until NCO groups can no longer be detected.

The copolymers were prepared according to the procedure described in example 1 with the exception that the reaction with the catalyst, the starter, propylene oxide and epoxybutene was performed in an autoclave.

The product is subsequently dispersed at 95° C. with 1000 g of distilled water and the dispersion is adjusted with water and triethylamine to a viscosity of 1070 mPas (D=40 s$^{-1}$, 23° C.).

The aqueous, urethane-modified polyester resin thus obtained has an acid number of 27 mg KOH/g, an average particle size of 200 nm and a solids content of 46.1%.

Example 4 (Inventive)

A 4 l reaction vessel with cooling, heating and stirring means is charged with 602 g of the polyester from Ex. 1 and this initial charge is heated to 80° C. together with 58 g of dimethylolpropionic acid, 150 g of the linear polyetherdiol used in Ex. 1 having an OH number of 75 mg KOH/g, 150 g of N-methylpyrrolidone and 22 g of triethylamine and this mixture is homogenized for 30 minutes. Then 190 g of 1-isocyanato-3,3,5-trimethyl-5-isocyanatomethylcyclohexane (IPDI) are added with vigorous stirring and the mixture is heated (utilizing the exothermic nature of the reaction) to 100° C. and held at this temperature until NCO groups can no longer be detected.

The product is subsequently dispersed at 95° C. with 1000 g of distilled water and the dispersion is adjusted with water and triethylamine to a viscosity of 620 mPas (D=40 s$^{-1}$, 23° C.).

The aqueous, urethane-modified polyester resin thus obtained has an acid number of 26 mg KOH/g, an average particle size of 240 nm and a solids content of 45.7%.

Example 5 (Inventive)

A 15 l reaction vessel with stirrer, heating means and water separator with cooling means is charged with 1347 g of trimethylolpropane, 5631 g of soya oil fatty acid, 3722 g of phthalic anhydride and 2614 g of neopentyl glycol and this initial charge is heated to 140° C. under nitrogen in one hour. In a further 8 hours it is heated to 220° C. and is condensed at this temperature until an acid number of less than 3 has been reached. The polyester resin thus obtained has a viscosity (determined as the efflux time of a 80% strength solution of the polyester in xylene in the DIN 4 cup at 23° C.) of 59 seconds and an OH number of 46 mg KOH/g.

A 4 l reaction vessel with cooling, heating and stirring means is charged with 1410 g of the above-described polyester precursor and this initial charge is heated to 100° C. together with 151 g of dimethylolpropionic acid, 390 g of the linear polyetherdiol described in Ex. 1 with the OH number of 75 mg KOH/g and 650 g and N-methylpyrrolidone and this mixture is homogenized for 30 minutes. The mixture is then cooled to 70° C. and 650 g of 1-isocyanato-3,3,5-trimethyl-5-isocyanatomethyl-cyclohexane (IPDI) are added with vigorous stirring. The reaction mixture is held at this temperature with stirring until an NCO content of 2.5% has been reached (approximately 10–15 h). Then 114 g of triethylamine are stirred in homogeneously.

In a 6 l reaction vessel with cooling, heating and stirring means, 2080 g of the resultant NCO prepolymer at a temperature of 55° C. are subsequently introduced over the course of 5–10 minutes with stirring into 1395 g of distilled water brought beforehand to a temperature of 30° C. The resultant mixing temperature is about 40° C. is established. The crude dispersion is cooled to about 30° C. and then a solution of 36.4 g of ethylenediamine in 815 g of distilled water is added with stirring. Stirring is continued at 35–40° C. for 2 h and then the system is adjusted with water and triethylamine to a viscosity of 2300 mPas (D=40 s$^{-1}$, 23° C.).

The polyurethane dispersion thus prepared has an acid number (in 100% form) of 25 mg KOH/g, an average particle size of 42 nm and a solids content of 37.2%.

Example 6 (Comparative Example)

Preparation of a Fatty-Acid-Based, Urethane-Modified Polyester Dispersion

A 4 l reaction vessel with cooling, heating and stirring means is charged with 1126 g of the polyester precursor from Ex. 1 which is heated to 80° C. together with 87.5 g of dimethylolpropionic acid, 244 g of N-methylpyrrolidone and 33 g of triethylamine and homogenized for 30 minutes. Then 286.5 g of 1-isocyanato-3,3,5-trimethyl-5-isocyanatomethylcyclohexane (IPDI) are added with vigorous stirring and the mixture is heated (utilizing the exothermic nature of the reaction) to 100° C. and held at this temperature until NCO groups can no longer be detected.

Thereafter 14.4 g of ethoxylated nonylphenol are added, the mixture is dispersed in about 1400 g of water and homogenized, and the homogenized dispersion is adjusted with water and triethylamine to a viscosity of 1100 mPas (D=40 s$^{-1}$, 23° C.). The aqueous, urethane-modified polyester resin obtained has an acid number of 27 mg KOH/g and a solids content of 45%.

Application Example 1 (Oxidatively Drying Topcoats)

The dispersions of Examples 1–5 and of comparative Example 6 are admixed with Octasoligen® Co 7 aqua (cobalt siccative, 50% strength in water, Borchers GmbH) corresponding to a concentration of 0.06% Co metal based on resin solids (binder in 100% form), diluted with water to an efflux time of about 30 seconds (DIN 4 cup, 23° C.) and applied using a doctor blade to degreased glass plates and degreased steel panels (dry film thickness 50 μm). After drying at room temperature, defect-free coating films are obtained which have a good level of properties.

Performance properties of oxidatively drying coating materials according to application Example 1 based on the dispersions from Ex. 1–6:

| Dispersion from example | Gloss 20° | Through-drying | Xylene resistance* | Pendulum hardness after 2d/14d RT | Water resistance wrinkling (8/24 h) | Water resistance fall in gloss* (3/8/24 h) |
|---|---|---|---|---|---|---|
| 1 | 80 | 7 h | 2 | 24/76 s | OK/OK | 0/2/4 |
| 2 | 77 | 8 h | 2 | 18/46 s | OK/OK | 0/2-3/5 |
| 3 | 74 | 8 h | 2 | 16/54 s | OK/OK | 0/3/5 |
| 4 | 71 | 7 h | 2 | 31/95 s | OK/OK | 0/0/3 |
| 5 | 75 | 7 h | 2 | 21/35 s | OK/OK | 0/1/4 |
| 6 (comparative) | 78 | 8 h | 2 | 26/59 s | wrinkled/severely wrinkled | 2/4/5 |

*Evaluations from 0–5 possible; 0 = film undamaged, 5 = film very severely damaged Table 1 shows that the dispersions prepared in accordance with the inventive examples 1–5 exhibit an enhanced water resistance. In the case of comparative example 6, both a marked drop in gloss after just 3 h and also slight wrinkling after 8 h and severe wrinkling of the film after 24 h, which is also no longer reversible, are found. In comparison, the coating materials based on Examples 1 to 5 exhibit much better results.

Example 7 (Inventive)

In a 2 l four-necked flask with stirring means, reflux condenser and internal thermometer, 163.8 g of the linear polyetherdiol described in Ex. 1 with an OH number of 75 mg KOH/g, 181 g of a polytetramethylene ether glycol having an OH number of 56 mg KOH/g, 37.2 g of dimethylolpropionic acid, 18.3 g of 1,6 hexanediol and 97.4 g of N-methylpyrrolidone are mixed with one another and heated to 70° C. before 275.5 g of Desmodur® W (product of Bayer AG, Leverkusen) are added rapidly. The temperature is held at 80° C. before being lowered to 70° C. when the NCO content of the prepolymer reaches a level of 4.4%, and 19.6 g of triethylamine are added. After 10 minutes, 500 g of the prepolymer are transferred over the course of 5 minutes to a second 2 l flask fitted with a stirrer and containing 670 g of water (20° C.). After 10 minutes of intensive stirring, a mixture of 5.2 g of hydrazine hydrate, 8.4 g of ethylenediamine and 74.4 g of water is added over the course of 5 minutes. The resulting mixture is then stirred at 40° C. until NCO can no longer be detected in the dispersion. This polyurethane dispersion has an average particle size of 69 nm and a solids content of 35.3%.

A clearcoat material consisting of 87.9% of this polyurethane dispersion, 3.0% of butyl glycol, 1.0% of Byk® 028 (defoamer from Byk Chemie, Wesel), 0.2% of Byk® 024 (defoamer from Byk), 0.2% of Byk® 346 (substrate wetting additive from Byk), 0.5% of Byk® 381 (levelling additive from Byk), 0.2% of TS® 100 (matting agent from Degussa AG, Frankfurt), 2.0% of Aquamat® 263 (wax/slip additive from Byk) and 2.0% of Acrysol® RM 8 (5% strength), thickener from Rohm and Haas, Philadelphia) is knifecoated onto a glass plate, using a doctor blade with a slot width of 200 μm, and dried at room temperature for 7 days. This gives a clear, glossy film having a pendulum hardness (drying at RT for 14 days) of 115 seconds.

Example 8 (Inventive)

In a 2 l four-necked flask with stirring means, reflux condenser and internal thermometer, 163.8 g of the linear polyetherdiol described in Ex. 2 with an OH number of 73 mg KOH/g, 181 g of a polytetramethylene ether glycol having an OH number of 56 mg KOH/g, 37.2 g of dimethylolpropionic acid, 18.3 g of 1,6 hexanediol and 97.4 g of N-methylpyrrolidone are mixed with one another and heated to 70° C. before 275.5 g of Desmodur® W (product of Bayer AG, Leverkusen) are added rapidly. The temperature is held at 80° C. before being lowered to 70° C. when the NCO content of the prepolymer reaches a level of 4.4%, and 19.6 g of triethylamine are added. After 10 minutes, 500 g of the prepolymer are transferred over the course of 5 minutes to a second 2 l flask fitted with a stirrer and containing 670 g of water (20° C.). After 10 minutes of intensive stirring, a mixture of 5.2 g of hydrazine hydrate, 8.4 g of ethylenediamine and 74.4 g of water is added over the course of 5 minutes. The resulting mixture is then stirred at 40° C. until NCO can no longer be detected in the dispersion. This polyurethane dispersion has an average particle size of 70 nm and a solids content of 35.3%.

A clearcoat material consisting of 87.9% of this polyurethane dispersion, 3.0% of butyl glycol, 1.0% of Byk® 028 (defoamer from Byk Chemie), 0.2% of Byk® 024 (defoamer from Byk), 0.2% of Byk® 346 (substrate wetting additive from Byk), 0.5% of Byk® 381 (levelling additive from Byk), 0.2% of TS® 100 (matting agent from Degussa AG), 2.0% of Aquamat® 263 (wax/slip additive from Byk) and 2.0% of Acrysol® RM 8 (5% strength), thickener from Rohm and Haas) is knifecoated onto a glass plate, using a doctor blade with a slot width of 200 μm, and dried at room temperature for 7 days. This gives a clear, glossy film having a pendulum hardness (drying at RT for 14 days) of 80 seconds.

Example 9
Oligomer Precursor for Ex. 10

A 5 l reactor with distillation attachment is charged with 3200 g of castor oil and 1600 g of soya oil and with 2.4 g of dibutyltin oxide. A stream of nitrogen (5 l/ h) is passed through the reactants. Over the course of 140 minutes they are heated to 240° C. After 7 hours at 240° C., the mixture is cooled. The OH number is 109 mg KOH/g, the acid number 2.5 mg KOH/g.

Example 10 (Comparative Example)
Preparation of a Fatty-Acid-Based Polyurethane Dispersion 339 g of polytetramethylene ether glycol having an OH number of 56 mg KOH/g, 248 g of the polyester oligomer precursor 70 g of dimethylolpropionic acid, 34 g of hexane 1,6 diol and 34 g of N-methylpyrrolidone are heated to 70° C. and stirred until a clear solution has formed. Then 516 g of Desmodur® W (Bayer AG, Leverkusen) are added and the mixture is heated to 100° C. It is stirred at this temperature until the NCO content is 4.1%. Then it is cooled to 70° C. and 52.6 g of triethylamine are added.

650 g of this solution are dispersed with vigorous stirring in 601 g of water introduced as an initial charge at a temperature of 30° C. Dispersion followed by 5 minutes of subsequent stirring. Then, over the course of 5 minutes, a solution of 3.9 g of hydrazine hydrate and 10.2 g of ethylenediamine in 200 g of water is added. For complete reaction of the isocyanate groups the mixture is stirred at 45° C. until NCO groups can no longer be detected.

The polyurethane dispersion thus prepared has an average particle size of 60 nm and a solids content of 35%.

A clearcoat material consisting of 87.9% of this polyurethane dispersion, 3.0% of butyl glycol, 1.0% of Byk® 028 (defoamer from Byk Chemie), 0.2% of Byk® 024 (defoamer from Byk), 0.2% of Byk® 346 (substrate wetting additive from Byk), 0.5% of Byk® 381 (levelling additive from Byk), 0.2% of TS® 100 (matting agent from Degussa AG), 2.0% of Aquamat® 263 (wax/slip additive from Byk) and 2.0% of Acrysol® RM 8 (5% strength, thickener from Rohm and Haas) is knifecoated onto a glass plate, using a doctor blade and a slot width of 200 μm, and dried at room temperature for 7 days. This gives a clear, glossy film having a pendulum hardness (drying at RT for 14 days) of 75 seconds.

Example 11 (Inventive)
UV-Curing and Oxidatively Drying Dispersion

A 2 l reaction vessel with stirrer, internal thermometer and gas inlet (air flow 2 to 3l/h) is charged with 313.0 g of the polyester acrylate Laromer® PE 44F (polyester acrylate; BASF AG, Ludwigshafen, DE), OH content approx. 80 mg KOH/g, and also 87.7 g of polyetherdiol from Example 1, 21.0 g of dimethylolpropionic acid, 0.5 g of dibutyltin dilaurate and 172.2 g of acetone, then the mixture is treated with 79.9 g of Desmodur® I (isophorone diisocyanate; Bayer AG, Leverkusen, DE) and 39.4 g of Desmodur® H (hexamethylene diisocyanate; Bayer AG, Leverkusen, DE) and heated in such a way that a constant acetone reflux prevails. Stirring is carried out at this temperature until the reaction mixture comprises an NCO content of 1.6% by weight. It is then cooled to 40° C. and 15.8 g of triethylamine are added rapidly. After 10 minutes the reaction mixture is poured with rapid stirring into 938.1 g of water at 18° C. After the dispersion has formed, 8.0 g of ethylenediamine in 23.5 g of water are added. After 30 minutes of subsequent stirring without heating or cooling, the product is distilled in vacuo (50 mbar, max. 50° C.) until a solids content of 38.6% by weight has been reached. The viscosity of the dispersion amounted to 24.7 s efflux time in the DIN 4 cup, the pH was found to be 8.6, and the average particle size by laser correlation spectroscopy measurement (Zetasizer 1000, Malvern Instruments, Malvern, UK) was 60.0 nm.

Application Example 12

1.5% by weight of Irgacure® 500 (photoinitiator from Ciba Spezialitätenchemie, Lampertheim, Del.), calculated on the basis of the solids content of the dispersion, are stirred into a portion of the inventive dispersion from Example 11. After standing overnight, the dispersion is drawn down onto the glass plate using a 150 μm bone doctor blade. The coated glass plate is stored at room temperature for 40 minutes. A clear, transparent film which is dry to the touch is formed. Thereafter the coated glass plate is moved at a speed of 5 m/min under a medium-pressure mercury lamp (output 80 W/cm lamp length). The film UV-cured in this way is exhibits 30 minutes after irradiation a König pendulum hardness of 59. Over the course of 36 hours of storage at room temperature, the pendulum hardness rises to 82.

What is claimed is:

1. Water-dilutable polymer containing urethane groups and containing ionic and/or potentially ionic groups, characterized in that the polymer comprises the repeating units (A1) of the formula (I) and/or (A2) of the formula (II)

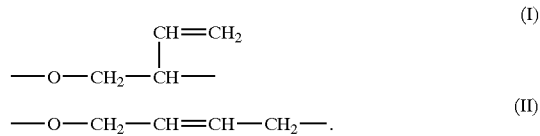

2. Water-dilutable polymer according to claim 1, characterized in that the repeating units A1, A2 or A1/A2 mixtures in the polymer are in blocks

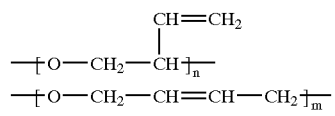

or in blocks which are a mixture of both structural units, with p repeating units, where n, m and p each represent whole numbers from 3 to 100.

3. Water-dilutable polymer according to claim 1 or 2, characterized in that the polymer is a reaction product comprising the following components:

(a1) from 5 to 80% by weight of polyisocyanates, (a2) from 10 to 80% by weight of polyols and/or polyamines having an average molar weight $M_n$, of at least 400, (a3) from 2 to 15% by weight of compounds containing at least one group which is reactive towards isocyanate groups and at least one ionic and/or potentially ionic group, (a4) from 0 to 20% by weight of low molecular mass polyols and/or secondary polyamines, (a5) from 0 to 20% by weight of chain terminators, (a6) from 0 to 20% by weight of chain extenders, which contain at least two groups which are reactive towards isocyanate groups, and are different from (a2), (a3) and (a4).

4. Water-dilutable polymer according to claim 1, characterized in that it further comprises C=C double bonds in structural units of monounsaturated or polyunsaturated fatty acids.

5. Water-dilutable polymer according to claim 1, characterized in that it further contains C=C double bonds in acrylic and/or methacrylic ester units A3 of the formula (III)

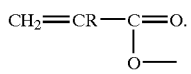
(III)

6. Water-dilutable polymer according to claim 1, characterized in that the polymer contains from 9 to 100 meq/100 g of ionic and/or potentially ionic groups.

7. Water-dilutable polymer according to claim 1, characterized in that ionic and/or potentially ionic groups are carboxyl and/or sulphonic acid groups.

8. Water-dilutable polymer according to claim 1, characterized in that the polymer has a urethane group content of from 1 to 40% by weight.

9. Water-dilutable polymer according to claim 1, characterized in that the polymer contains from 2 to 80% by weight of structural units $A_1$ and/or $A_2$.

10. Aqueous dispersion comprising
(A) from 20 to 70% by weight of at least one water-dilutable polymer containing urethane groups according to claim 1,
(B) from 0 to 20% by weight of organic cosolvents and
(C) from 10 to 70% by weight of water.

11. Coating compositions comprising a water-dilutable polymer containing urethane groups according to claim 1.

12. Process for producing oxidatively drying coatings, comprising applying a coating composition comprising as binder the water-dilutable polymers containing urethane groups according to claim 1, to a substrate.

13. Process for producing UV-curing coatings, comprising applying a coating composition comprising as binder the water-dilutable polymers containing urethane groups according to claim 1 and one or more photoinitiators, to a substrate.

14. A method of producing oxidatively drying coatings comprising combining the water-dilutable polymers containing urethane groups according to claim 1 with one or more auxiliaries and additives selected from the group consisting of pigments, fillers, antisettling agents, defoamers, wetting agents, levelling agents, reactive diluents, plasticizers, catalysts, auxiliary solvents and thickeners.

15. A method of producing UV-curing coatings comprising combining the water-dilutable polymers containing urethane groups according to claim 1, one or more photoinitiators, and optionally one or more auxiliaries and additives selected from the group consisting of pigments, fillers, antisettling agents, defoamers, wetting agents, levelling agents, reactive diluents, plasticizers, catalysts, auxiliary solvents and thickeners.

16. Substrates coated with coating compositions comprising water-dilutable polymers containing urethane groups according to claim 1.

17. Water-dilutable polymer according to claim 2, characterized in that the polymer contains from 9 to 100 meq/100 g of ionic and/or potentially ionic groups.

18. Water-dilutable polymer according to claim 3, characterized in that the polymer contains from 9 to 100 meq/100 g of ionic and/or potentially ionic groups.

19. Water-dilutable polymer according to claim 4, characterized in that the polymer contains from 9 to 100 meq/100 g of ionic and/or potentially ionic groups.

20. Water-dilutable polymer according to claim 5, characterized in that the polymer contains from 9 to 100 meq/100 g of ionic and/or potentially ionic groups.

21. Water-dilutable polymer according to claim 2, characterized in that ionic and/or potentially ionic groups are carboxyl and/or sulphonic acid groups.

22. Water-dilutable polymer according to claim 3, characterized in that ionic and/or potentially ionic groups are carboxyl and/or sulphonic acid groups.

23. Water-dilutable polymer according to claim 4, characterized in that ionic and/or potentially ionic groups are carboxyl and/or sulphonic acid groups.

24. Water-dilutable polymer according to claim 5, characterized in that ionic and/or potentially ionic groups are carboxyl and/or sulphonic acid groups.

25. Water-dilutable polymer according to claim 6, characterized in that ionic and/or potentially ionic groups are carboxyl and/or sulphonic acid groups.

* * * * *